March 18, 1941.   F. C. KOCH   2,235,639
RESOLUTION OF OIL AND WATER EMULSIONS
Filed May 10, 1938
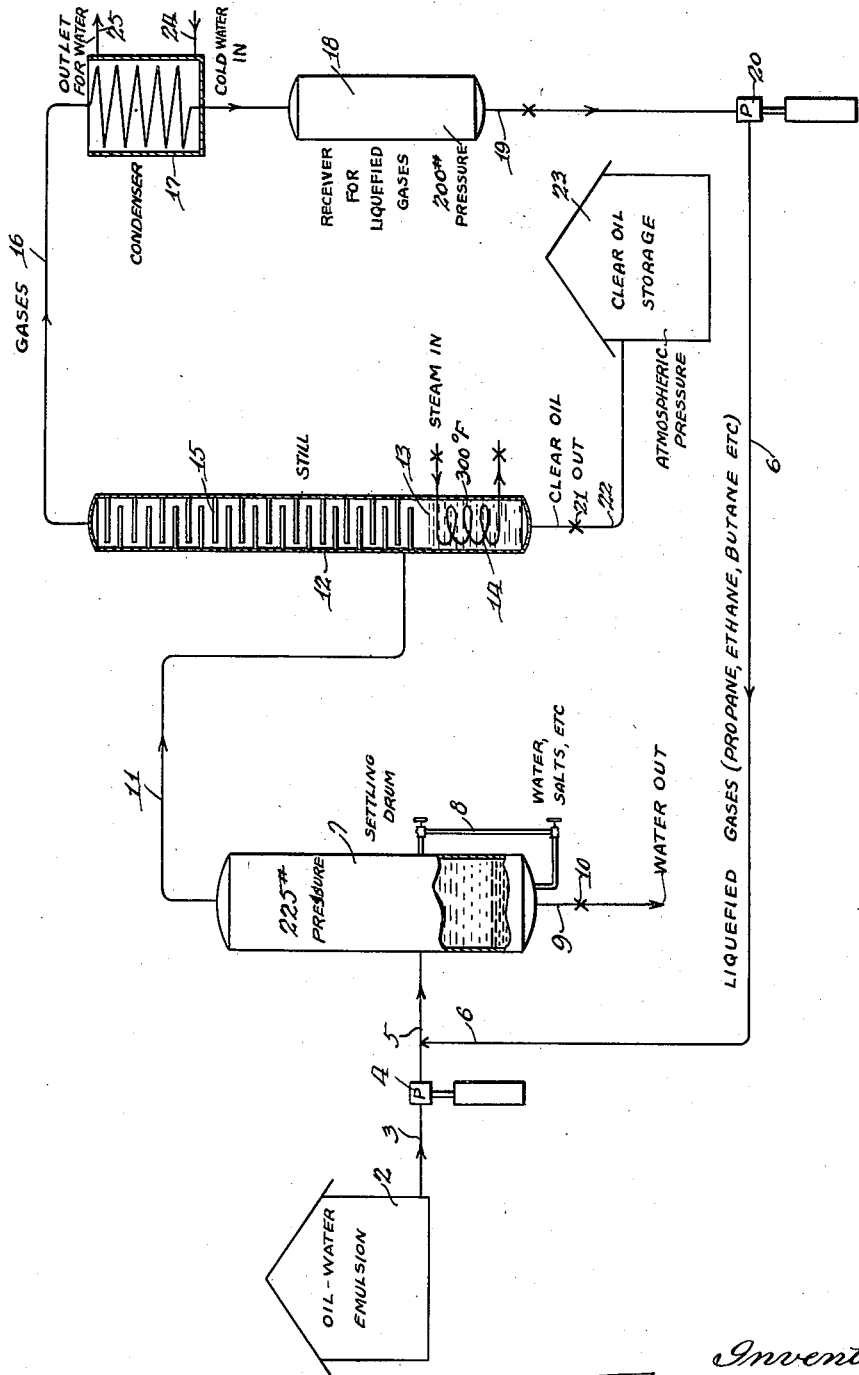

Patented Mar. 18, 1941

2,235,639

UNITED STATES PATENT OFFICE 2,235,639

RESOLUTION OF OIL AND WATER EMULSIONS

Fred C. Koch, Wichita, Kans., assignor to The Winkler - Koch Patent Company, Wichita, Kans., a corporation of Kansas Application May 10, 1938, Serial No. 207,018

7 Claims. (Cl. 196—5)

The present invention relates to an improved process for the resolution of an oil-and-water emulsion which comprises mixing the emulsion with a sufficient quantity of a liquefied hydrocarbon which is of such low boiling point that at ordinary atmospheric temperatures and pressures it can exist only in the gaseous condition but which is used at atmospheric temperatures under high enough pressure to liquefy the same so that it may act as a diluent for the oil portion of the emulsion, thereby gradually reducing the viscosity thereof so that the aqueous portions of the emulsion and any impurities suspended therein or in the oil portion may readily settle under the influence of gravity so as to be capable of removal, leaving the oil in a purified condition.

The invention also contemplates the separation of the liquefied hydrocarbon from the recovered oil, its conversion into the gaseous state and recondensation into the liquid state so that it may be reused in a cyclic manner, all as will hereinafter be more fully described.

In order to illustrate the invention there is furnished herewith a single sheet of drawings showing in purely diagrammatic and conventional form a system of interconnecting apparatus which serves effectively to carry out the invention herein disclosed and claimed.

Crude oil as it is recovered or pumped from the ground frequently contains admixed therewith sand, salt, salt water, and other impurities, as well as asphalt; while residues from various oil-treating and refining operations, tank bottoms, etc., also occasionally contain water in the form of an emulsion; so that it becomes necessary to purify these materials for the purpose of separating the asphalt and/or the water, salt, sand, silt, settlings, etc. from them. In the past it has been customary to demulsify crude oil which contains water as the dispersed phase by heating the crude oil to a temperature of about 300° F. under pressure and then allowing it to remain under pressure in the quiescent state until the water has coalesced and settled out in the mixture, forming a lower layer. Such means of separation however are only partly successful, and in many cases salt actually remains in the crude oil even though the water has been removed. The presence of this salt is very undesirable and is accompanied by many unpleasant consequences, as when the oil is distilled in a tube still, for example, where the salt will tend to adhere to the walls of the tubes, there serving to catch asphaltic matter which, under the influence of the heat applied to the tube, soon is converted into coke, causing a gradual plugging up of the tubes, requiring a shutdown of the furnace and cleaning of the tubes to restore them to operative condition.

While heating of the oil serves to reduce its viscosity, thus making it somewhat easier for the water to coalesce and settle out, this reduction is insufficient. It has already been proposed to dilute such crude oil with relatively light hydrocarbons such as gas oil, kerosene, and similar hydrocarbons which are liquid at room temperatures, but such large amounts of these have to be used as to render the process quite uneconomical. Furthermore, the separation of these relatively high-boiling oils requires the heating of the oil; and because of the fact that these diluents have a fairly high boiling point, which is not a fixed one but varies over a comparatively large temperature scale, it is impossible to distill these diluents from the demulsified oil without also carrying over into the overhead considerable quantities of the relatively lighter constituents of the oil itself, thus rendering the recondensed overhead products of a lower Baumé gravity than they were originally, requiring further fractional separation before they can be reused as diluents for demulsification purposes.

Contrary to the prior art methods, it has been found by the inventor that greatly superior results may be obtained by employing as diluents rather definite hydrocarbons having a narrow boiling-point range, which because of their own low specific gravity (high Baumé gravity) exert a very much greater effect for reduction of viscosity than do such hydrocarbons as are liquid at room temperatures. For this reason the inventor chooses as a diluent hydrocarbon gases which at ordinary atmospheric temperatures and pressures exist in gaseous condition. Examples of such hydrocarbons are ethane, propane, butane, ethylene, propylene, butylene, and similar more or less saturated or unsaturated hydrocarbon gases which have less than five carbon atoms in the molecule. No particular configuration of the hydrocarbons is necessary, and they may be either straight chain or branch chain hydrocarbons. Because of their commercial availability and ease of liquefaction with pressures readily obtained, propane and isopropane have been found to be particularly suitable, but it is to be distinctly understood that the present invention is not to be considered as limited to the propanes.

Referring now to the drawing, let it be assumed that the oil-water emulsion is contained in the storage tank 2, from which it flows through the pipe 3 to the positive pressure pump 4, being forced by this pump into the line 5. A supply of liquefied hydrocarbon gas—for example, propane—is also pumped by means of the pump 20 through the line 6 so as to enter the pipe 5, commingling therein with the emulsion so that the combined liquefied hydrocarbon gas and the oil-water emulsion are forced under the influence of the pressure exerted by both pumps into the pressure chamber or settling drum 7 in which a pressure is maintained high enough to keep the hydrocarbon gas in liquid condition. When propane is used, a pressure of 225 pounds per square inch superatmospheric (that is, gauge pressure) will suffice for this purpose. The emulsion is maintained in this settling drum 7 for a time sufficient to permit the settling out of water, sand, silt, salt solution, etc., which will settle in the bottom of the drum because of the fact that these materials are heavier in specific gravity than the oil portion of the emulsion, the effect of the settling being made apparent to the operator by observation through a suitable sight-glass 8 provided at the side of the drum 7. When the water, etc. has settled out, it may be discharged from the settling drum 7 through the pipe 9 under the control of the valve 10 and then disposed of as desired. The oil itself is discharged from the top of the drum 7, through the line 11, and passed to a bubble tower still 12. This can be done because emulsion and liquefied hydrocarbon gas are continuously sent into the drum so that, in effect, oil will continuously flow through the pipe 11, while water, salt, etc. are continuously discharged from the bottom of the drum 7, through the pipe 9 and the valve 10. The pipe 11 enters the still 12 near the lower portion thereof so as to form a constant pool of oil 13 in the bottom of the still. A steam coil 14, provided with the necessary valves and means for supplying steam (which latter is not shown), is provided in the lower portion of the still 12 for the purpose of heating the mixture of oil and liquefied hydrocarbon gas to a temperature sufficient under the existing pressure to volatilize the hydrocarbon gas so that it will again assume its gaseous condition. The gas then entraining some of the oil will rise upwardly in the still 12, traversing the bubble decks or plates 15 therein so that, by the time the gas reaches the top of the still 12, practically pure hydrocarbon gas will issue therefrom through the pipe 16. The pipe 16 leads to a water-cooled condenser 17 provided with a cold-water inlet 24 and a water outlet 25 so that the gas is then cooled to atmospheric temperature or slightly below, whereby it is recondensed to a liquid which flows from the condenser 17 into the receiver 18, collecting therein in liquid form. From the receiver it may be withdrawn through the pipe 19, to be sent by means of the pump 20 into the pipe 6 for reintroduction into the line 5 and thence to the settling drum 7. The clear oil from which the gas has been removed by the heat imparted to it by the pipe 14 is withdrawn from the bottom of the still 12 through the valve 21 and is passed through the pipe 22 into the clear-oil storage reservoir 23.

If propane be the hydrocarbon gas employed, a temperature of 300° F. in the lower part of the still 12 will be sufficient to volatilize the propane, while a pressure of 200 pounds in the still, the condenser 17 and the receiver 18 will be sufficient under the cooling effect of the water in the condenser to reconvert the gaseous propane into liquid that accumulates in the receiver 18, ready for use, to be forced by means of the pump 20 through the line 6, into the line 5 and thence back into the settling drum 7.

It will thus be seen that the process can be operated in a cyclic and continuous manner.

It has been found that liquid propane when mixed with a high boiling oil is an excellent precipitant for any asphalt which may have been dissolved in the oil, particularly at temperatures between 80° and 140° F., provided that the volume of propane relative to the volume of oil is about 3 parts of propane to one part of oil or greater. By using a lesser amount of propane, say about ½ of a volume compared with the oil to an equal volume as compared with the oil, the process can be adjusted to remove only salt water or water, while by increasing the propane:oil ratio the asphalt can be precipitated at the same time.

The particular advantages that flow from the present process are that no heat need be applied to the emulsion and that no steam is produced because all the water is settled out of the drum 7 before the dewatered oil reaches the still 12. Furthermore the temperature used in the still 12 is easily attained by a steam coil which may be fed by an ordinary steam boiler such as is commonly found around an oil refinery, while the pressure employed is low enough to permit the use of comparatively inexpensive apparatus. When using ethane, the pressure of course will have to be correspondingly higher, and with butane it could well be lowered. The exact temperature depends upon the physical characteristics of the particular gas employed, and its selection lies within the skill of the operator.

A further advantage lies in the fact that these gases, when liquefied, form liquids of very low specific density (high Baumé gravity), and hence their viscosity-reducing properties in admixture with oil are very great. Furthermore, they have but slight tendency to cause the vaporization of the higher-boiling constituents of the oil, so that when once gasified and recondensed they can be recovered in substantially their original condition, ready for reuse.

Obvious modifications of the apparatus setup are of course within the skill of the operators and are to be considered as within the scope of the hereunto appended claims.

I claim:

1. A cyclic process for resolving emulsions of oil and water which comprises forcing the emulsion under pressure into a primary high-pressure zone and mixing it therein at ordinary atmospheric temperature with a liquefied hydrocarbon gas having less than five carbon atoms, sufficient pressure being maintained in said zone to prevent vaporization of the said gas, storing the mixture in said zone for a sufficient time to allow settling out of the water and other non-oily material from the emulsion leaving the oil supernatant thereon, withdrawing the water from the primary zone, transferring the oil while still under pressure to a secondary zone and heating it therein to a temperature sufficient to regasify the hydrocarbon gas, thereby producing a vaporous mixture; dephlegmating said mixture to remove condensable oil therefrom and thereafter cooling the hydrocarbon gas under pressure to convert it back to the liquid state; and forcing said reliquefied gas in admixture with a fresh portion of emulsion into said primary zone.

2. The process of claim 1 in which the hydrocarbon gas is propane and the pressure maintained in the primary zone is about 225 pounds per square inch superatmospheric and that in the secondary zone about 200 pounds per square inch superatmospheric.

3. A continuous process of resolving oil-and-water emulsions which comprises mixing such an emulsion with a liquefied hydrocarbon in a first zone maintained at an atmospheric temperature and an increased pressure sufficient to keep the mixture in liquid condition, said hydrocarbon being normally gaseous at atmospheric temperatures and pressures, retaining said mixture in said first zone until stratification occurs and the water settles out; discharging the water, transferring the oil-hydrocarbon mixture to a second zone maintained under pressure, heating the oil-hydrocarbon mixture under pressure in said second zone to vaporize the hydrocarbon, withdrawing the residual oil from said second zone, condensing the hydrocarbon under pressure, and turning the resulting hydrocarbon condensate into said first zone to become admixed therein with further quantities of emulsion to be resolved.

4. The process of claim 3 in which the hydrocarbon is selected from the group consisting of hydrocarbons having not more than four carbon atoms.

5. The process of claim 3 in which the hydrocarbon comprises ethane.

6. The process of claim 3 in which the hydrocarbon comprises propane.

7. The process of claim 3 in which the hydrocarbon comprises butane.

FRED C. KOCH.